United States Patent [19]

Kramer et al.

[11] Patent Number: 5,464,177
[45] Date of Patent: Nov. 7, 1995

[54] ENERGY ABSORBING IMPACT BARRIER

[75] Inventors: James H. Kramer, Fairlawn, Ohio; Daniel S. Lynch; Charles W. Coker, both of Virginia Beach, Va.

[73] Assignee: The B.F. Goodrich Company, Akron, Ohio

[21] Appl. No.: 174,907

[22] Filed: Dec. 29, 1993

[51] Int. Cl.⁶ .............................. E01F 13/04; B60G 11/22
[52] U.S. Cl. .................... 246/127; 404/11; 49/9; 49/131; 267/279
[58] Field of Search ............... 404/6, 9, 10, 11; 256/13.1; 293/136; 267/279, 280, 281, 154, 140; 49/9, 49, 131; 246/111, 120, 126, 127

[56] References Cited

U.S. PATENT DOCUMENTS

| | | | |
|---|---|---|---|
| 1,356,924 | 10/1920 | Kiss et al. | 246/127 |
| 1,671,875 | 5/1928 | Seitz | 49/9 X |
| 3,545,737 | 12/1970 | Lamprey | 267/279 X |
| 4,290,585 | 9/1981 | Glaesener | 404/6 X |
| 4,452,431 | 6/1984 | Stephens et al. | 404/6 X |
| 4,494,738 | 1/1985 | Britton et al. | 293/136 X |
| 4,497,593 | 2/1985 | Kramer | 267/140 X |
| 4,822,207 | 4/1989 | Swahlan | 49/131 X |
| 4,824,282 | 4/1989 | Waldecker | 404/6 |
| 4,887,934 | 12/1989 | Kramer | 267/140 X |
| 5,095,840 | 3/1992 | Kramer | 267/140 X |

Primary Examiner—Matthew C. Graham
Assistant Examiner—Kevin D. Rutherford
Attorney, Agent, or Firm—Richard A. Romanchik

[57] ABSTRACT

An energy absorbing motor vehicle barrier includes a collapsible energy absorption assembly which is stored in a vault in the ground. Upon deployment, the energy absorption apparatus is lifted out of its vault, where it thereby expands and deploys. The energy absorption apparatus includes four stages of pairs of elastomeric torsion springs configured into scissors arrangements, with each stage having a progressively higher effective spring rate, to thereby decelerate a vehicle which strikes the apparatus.

39 Claims, 12 Drawing Sheets

5,464,177

ENERGY ABSORBING IMPACT BARRIER

TECHNICAL FIELD

This invention relates to energy absorption devices and more particularly to a deployable barrier for safely decelerating motor vehicles at railroad crossings.

BACKGROUND ART

Railroad crossings typically have a swinging gate which lowers or swings an arm in place across a road way to prevent motor vehicle access to the train tracks when a train is in close proximity to the crossing. These crossing guards, however, can be circumvented with great ease by, for example, either the vehicle driving around the gate, or the vehicle crashing though the gate. The consequences of a driver circumventing a traditional highway gate was that the driver placed the occupants of the vehicle at risk of being struck by a moving train, the train normally not being damaged by the collision.

Newer, high speed trains are gaining popularity around the world. These high speed trains are lighter, faster moving trains than the traditional heavier, slower moving trains. A collision between one of these high speed trains and an automobile places not only occupants of the automobile in danger but also the passengers on the train, since it is much easier to derail a light weight high speed train than a heavier slower moving train. A need therefore has risen for a railroad crossing barrier which is very difficult to circumvent, such barriers being placed at the corridors for high speed trains. It is unsatisfactory, however, to provide a crossing barrier which severely injures or kills the occupants of the vehicle striking it. A need therefore has arisen for an improved railroad crossing barrier which has energy absorbing characteristics.

DISCLOSURE OF THE INVENTION

According to one aspect of the present invention, there is provided an apparatus for decelerating a moving vehicle comprising:

energy absorption means for absorbing kinetic energy of the moving vehicle upon collision of the vehicle with said energy absorbing means;

vault means for receiving said energy absorption means when it is not being used; and, deployment means for deploying said energy absorbing means in the path of the vehicle.

According to another aspect of the present invention, there is provided an apparatus for decelerating a moving vehicle comprising:

energy absorption means for absorbing kinetic energy of the moving vehicle upon collision of the vehicle with said energy absorbing means, said energy absorption means being comprised of a plurality of stages, each one of said plurality of stages having at least one pair of elastomeric torsion springs, each one of said elastomeric torsion springs in said at least one pair being pivotally connected in a scissors arrangement;

deployment means for deploying said energy absorbing means in the path of the vehicle;

controller means for controlling said deployment means to deploy said energy absorption means upon the occurrence of a predetermined event;

backing means for rigidly supporting said energy absorption means;

batterboard means for contacting the vehicle, said batterboard means being comprised of a plastic and elastomer composite; and, vault means for receiving said energy absorption, backing and batterboard means when it is not being used;

wherein said energy absorption means is collapsed for storage in said vault means and is expanded upon deployment by said deployment means.

According to another aspect of the present invention, there is provided an energy absorption apparatus comprising energy absorption means having at least one pair of elastomeric torsion springs pivotally connected in a scissors arrangement.

According to another aspect of the present invention, there is provided a method of decelerating a moving vehicle comprising the steps of storing an energy absorption means comprised of at least one pair of elastomeric torsion springs pivotally connected in a scissors arrangement in a vault and deploying said energy absorption means in the path of the vehicle in response to a predetermined event.

These and other objects, features and advantages of the present invention will become more apparent in the light of the detailed description of exemplary embodiments thereof, as illustrated by the drawings.

BEST MODE FOR CARRYING OUT THE INVENTION

Figure 1:
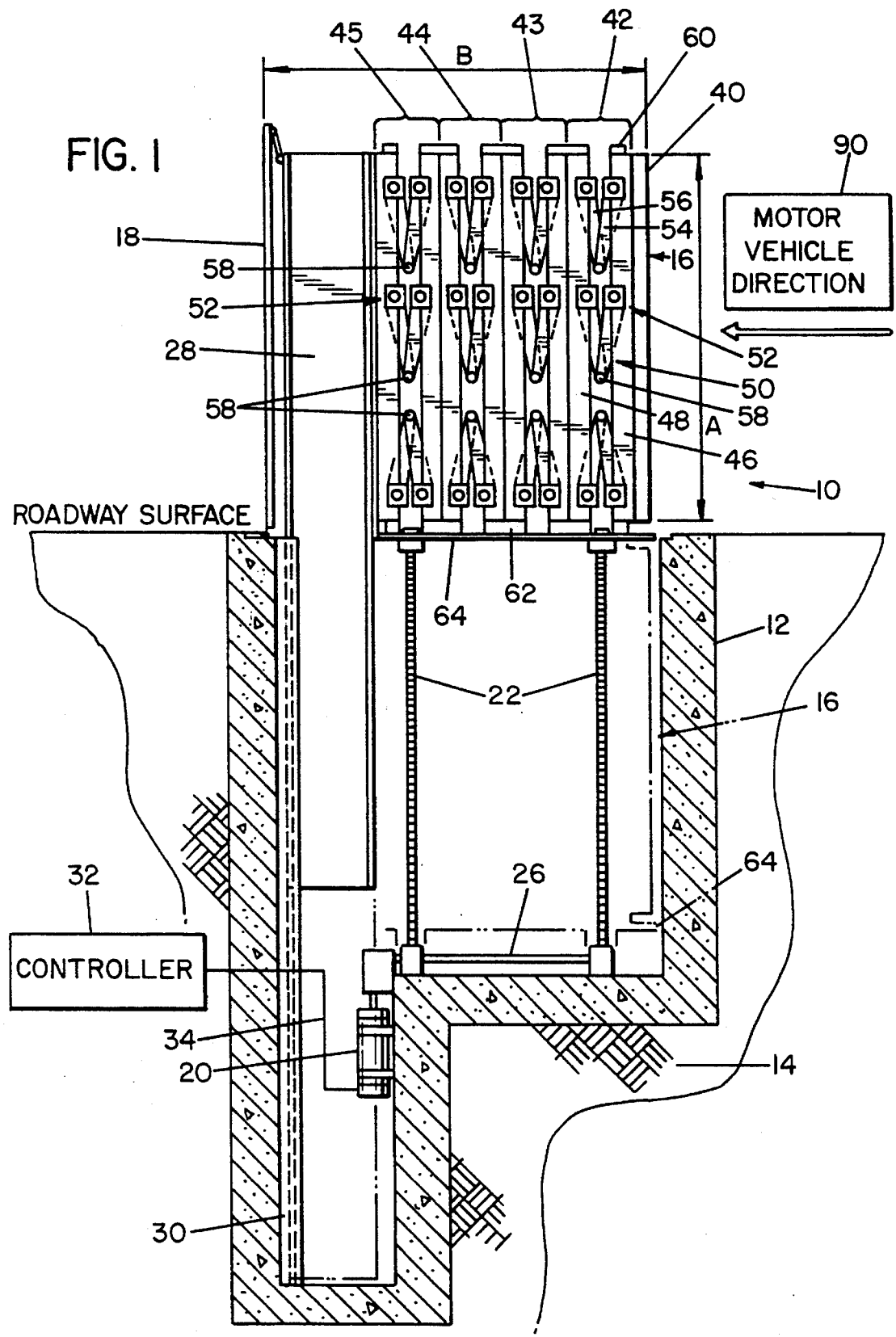
FIG. 1 is a side view of a barrier in accordance with the present invention in a collapsed state.
Figure 2:
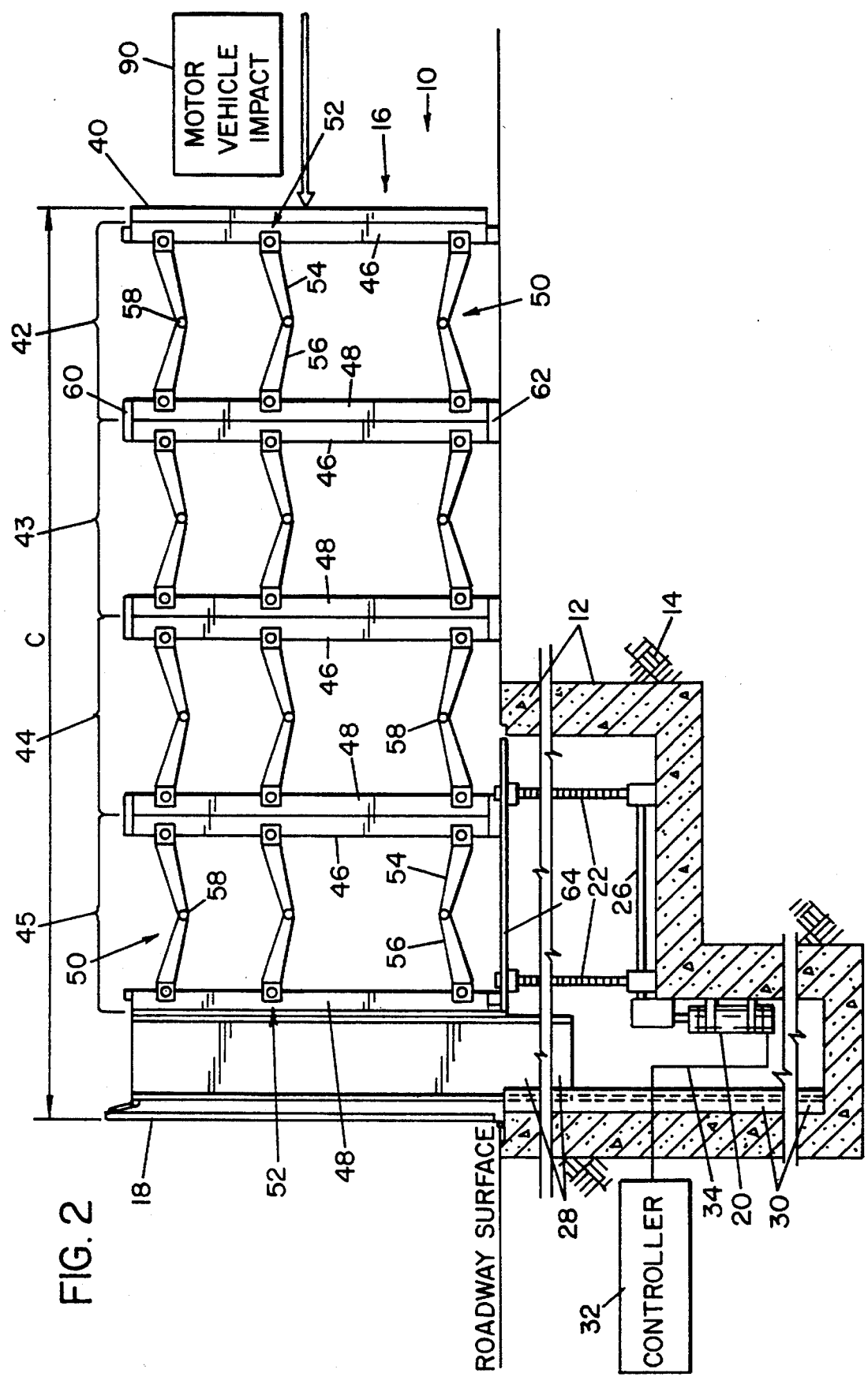
FIG. 2 is a side view of a barrier in accordance with the present invention in a deployed state.
Figure 3:
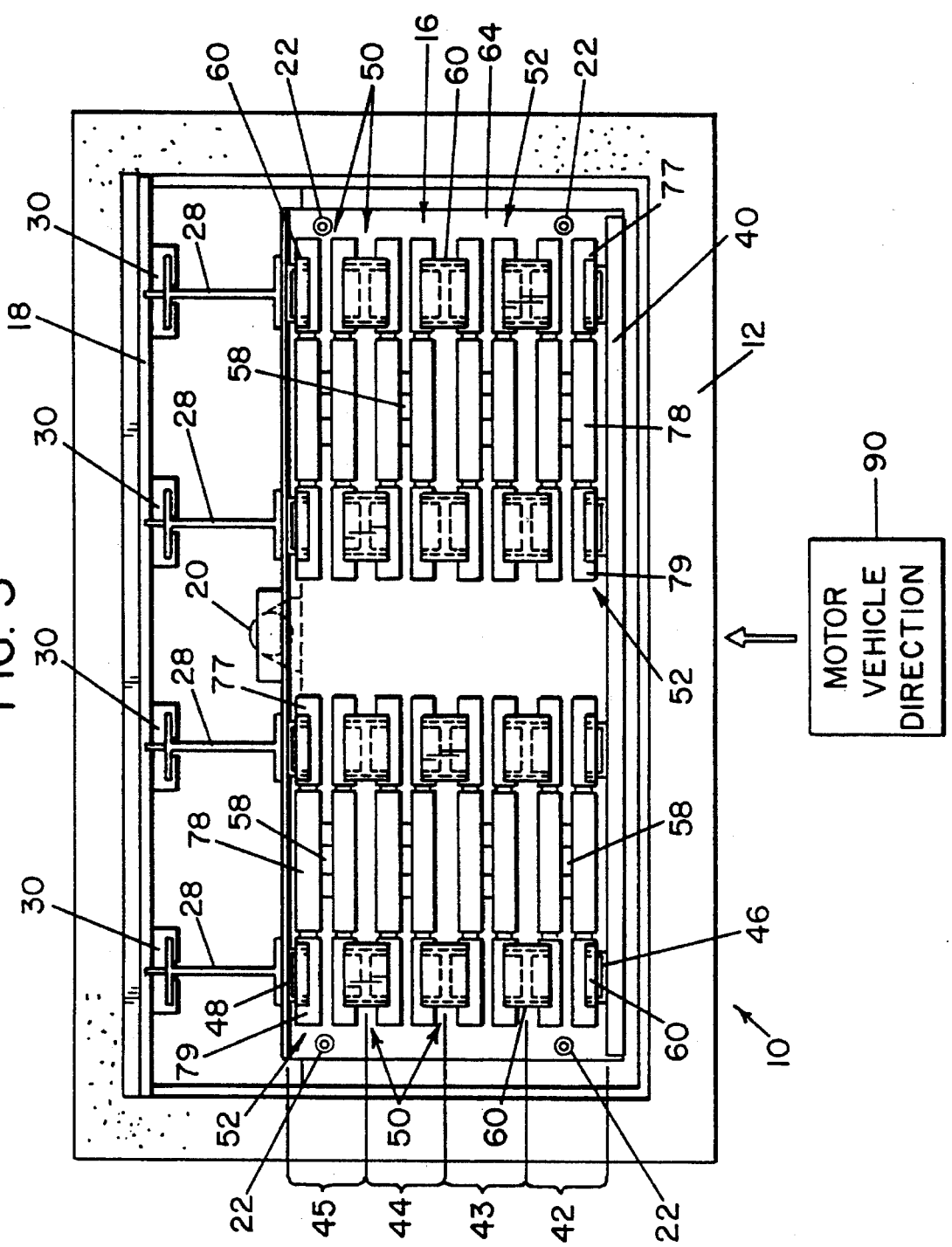
FIG. 3 is a top view of a barrier in accordance with the present invention in a collapsed state.

Referring now to the drawings wherein like reference numerals designate like or corresponding parts throughout the different views, there is shown in FIGS. 1, 2, and 3 a roadway barrier apparatus 10, which includes a vault 12 preferably of a concrete like material which is disposed within the ground 14. A collapsible energy absorption apparatus 16 is stored within the vault 12 before deployment. A lid 18 normally covers the vault and allows motor vehicles to pass thereover. Upon the eminent arrival of a train, or other event, the energy absorption apparatus 16 is elevated utilizing a drive motor 20 which turns four drive screws 22, through a gearing box 24 and drive shaft 26. Drive motor 20 also lifts four I beam supports 28 out of the vault. I beams 28 are preferably made of a rigid material such as steel and provide the rigid support to counteract forces acting on the energy absorption apparatus 16 from an impacting vehicle. I beams 28 are driven up and down on drive tracks 30. Drive motor 20 is controlled by a controller 32 via a control line 34. Energy absorption assembly 16 includes a front batterboard 40, and four collapsible energy absorption stages 42–45. Each stage includes a front brace 46 and a rear brace 48 connected together by a plurality of energy absorbent scissors assemblies 50. Each scissors assembly 50 is comprised of a pair of elastomeric torsion spring assemblies 52 having extending arms 54, 56 which are pivotally connected at a pivot point 58.

The energy absorption assembly 16 has an upper set of connecting members 60 and a lower set of connecting members 62, the lower set of connecting members may contact the ground upon deployment of the apparatus 10 and may therefore include rollers or casters (not shown). The energy absorption assembly 16 is supported by a support platform 64, which is disposed over the drive screws 22.

Energy absorption assembly 16 also includes a rebound control device 108 (illustrated in FIGS. 4, 10) to prevent the assembly 16 from springing the impacting vehicle back outward after its momentum has been stopped, and a deployment/retraction device (illustrated in FIGS. 12, 13) to deploy and retract assembly 16.

FIG. 1 illustrates the energy-absorption assembly 16 in the collapsed state, while FIG. 2 illustrates the energy absorption assembly in the deployed state. In the collapsed state, all of the scissors assemblies 50 are closed. Referring now to FIG. 2, as a motor vehicle strikes the batterboard 40, the pivot points 58 of each stage 42–45 travel essentially in a vertical direction, thereby rotating connecting legs 54–56 about the inner shafts (shown in greater detail hereinafter) of the respective spring assembly 52, thereby applying rotational force on the elastomeric members of the spring assemblies, which resist and transform such movement into stored energy. Horizontal movement of the batterboard 40 toward I beams 28 collapses each stage 42–45 in succession until I beams 28 provide a counter-reactive hard stop.

Figure 4:
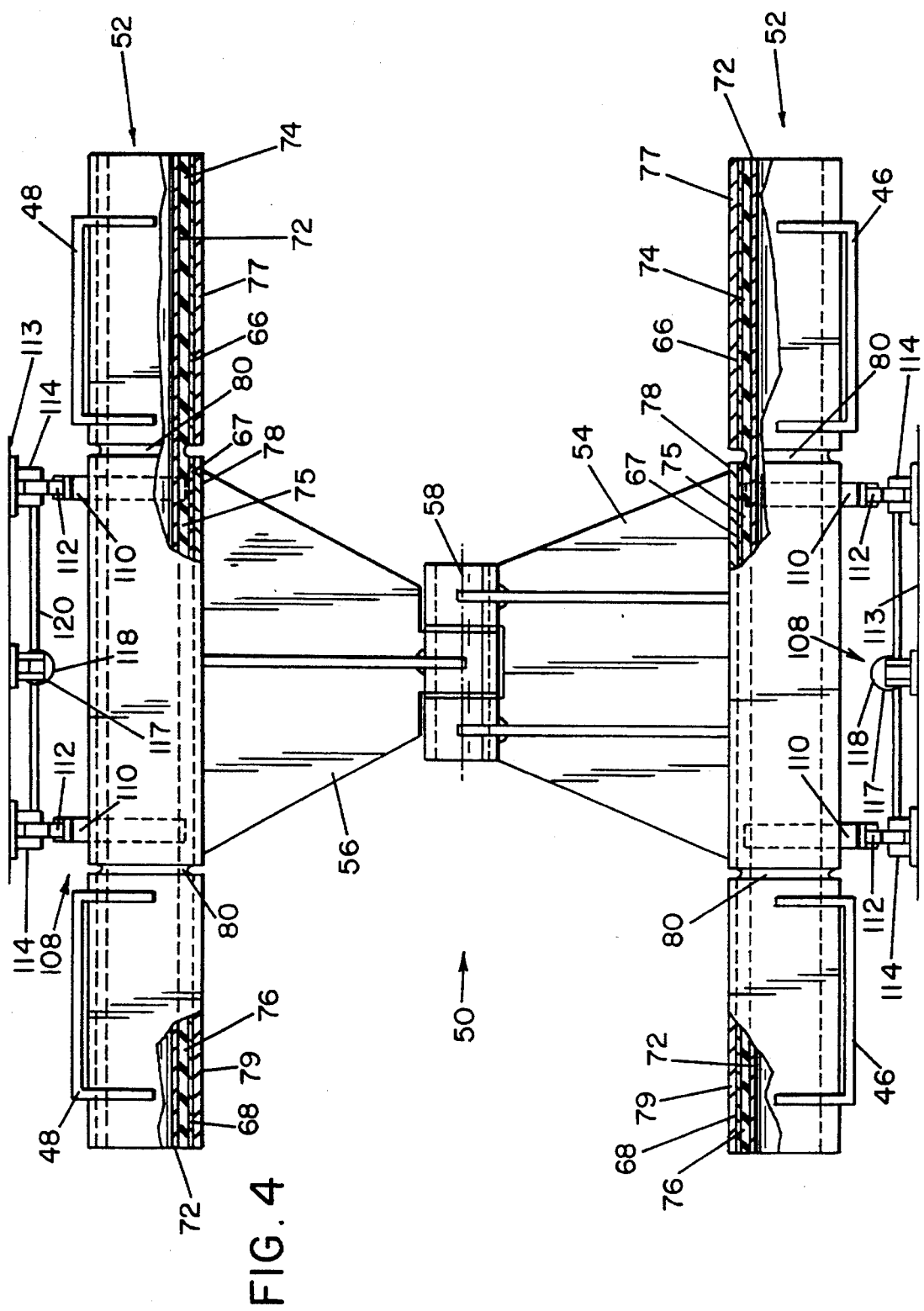
FIG. 4 is a top view of an elastomeric torsion spring scissors assembly in a deployed state in accordance with the present invention.

Referring now to FIG. 4, each scissors assembly 50 includes a pair of elastomeric spring assemblies 52, pivotally connected together by legs 56, 54 at a pivot point 58. Each spring assembly 52 is supported by a respective brace 46, 48. Each spring assembly 52 comprises a series spring arrangement and includes an inner shaft 72 attached to and interconnecting three elastomeric members 74,75,76. Elastomeric members 74,75,76 are disposed between the inner shaft 72 and three outer half shells 66,67,68, which are contained respectively within three square housings 77,78, 79. A rubber piece 80 extends between elastomeric members 74,75,76 as a consequence of each torsion spring assembly 52 being manufactured as an integral unit. It is to be noted that spring assembly 52 may also be comprised of three separate elastomeric torsion springs interconnected by a common inner shaft 72. This arrangement, however, would increase manufacturing costs over the assemblies illustrated. The spring assemblies 52 are a series spring arrangement, wherein the two outer shells 77, 79 are attached to the support members 46,48 while the middle outer shells 78 are attached to their respective leg members 54, 56. Moving support members 46, 48 closer together causes rotation of the arms 56, 54 about the pivot point 58 in a scissors type movement, thereby torquing elastomeric members 74,75,76 which absorb the energy applied thereto.

Referring now to FIGS. 1–3, operation of the crossing barrier 10 is as follows. Energy absorption assembly 16 is normally stowed in the vault 12 covered by lid 18 which is in the down position, thereby providing a smooth and continuous road surface for motor vehicles to travel over. Controller 32 detects the presence of an approaching train, and sends a signal via line 34 to energize motor 20 which drives the drive screws, thereby pushing I beams 28 and energy absorption apparatus 16 upward and opening lid 18. FIG. 1 illustrates the I beams 28 and energy absorption assembly 16 in the full up position. Next, the scissors assemblies 50 of the energy absorption assembly 16 are sprung open and pulled open to their fully deployed horizontal position, shown in FIG. 2. The rebound control device 108 is disengaged during this deployment phase. Impact by a motor vehicle into the batterboard 40 causes collapse of stages 42–45, the energy being absorbed by spring assemblies 52, which consequently decelerates the motor vehicle. The rebound control device 108 prevents the assembly 16 from springing back outward after the momentum of the vehicle has been stopped.

Spring assemblies 52 are preferably comprised of elastomeric torsion springs such as those described in U.S. Pat. No. 3,336,021 (Kramer) and U.S. Pat. No. 4,714,220 (Hillstrom et al.), which are hereby incorporated herein by reference. It is to be noted that spring assemblies 52 preferably have a square profile, to facilitate easy attachment of the outer shells 77,79 to the support members 46, 48.

Preferably, the elastomeric material chosen in the spring assemblies in stages 42–45 are chosen so that the spring rates of the stages progressively increase from stage 42 to stage 45. Spring assemblies in stage 42 would therefore have a lower spring rate than the spring assemblies in stage 43, which would have a lower spring rate than the spring assemblies in stage 44, which in turn would have a lower spring rate than the spring assemblies in stage 45. Each stage, thereby provides stiffening resistance to a motor vehicle traveling in the direction toward I beams 28. This progressive type of increasing resistance force prevents lighter or slower moving vehicles from becoming severely damaged, yet allowing for suitable stopping resistance to a heavier or faster moving vehicle.

Figure 5:
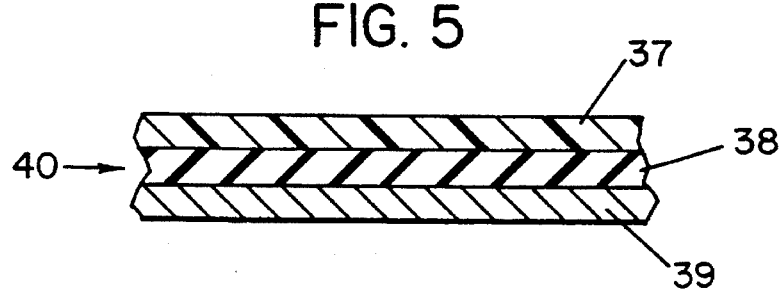
FIG. 5 is a cross sectional view of the batterboard of an energy absorption apparatus in accordance with the present invention.

Referring now to FIG. 5, batterboard 40 is preferably made of a top layer 37 of UHMWP, a middle layer 38 of elastomer, and a bottom rigid layer 39 of UHMWP or metal. Batterboard constructions are described in greater detail in U.S. Pat. Nos. 3,975,491, 4,679,517, 4,887,934 and 5,095, 840 all issued to Kramer, which are hereby incorporated herein by reference. It is to be noted that ground peanut shells may be utilized as a binder in both the UHMWP layers and elastomeric layer.

Figure 6:
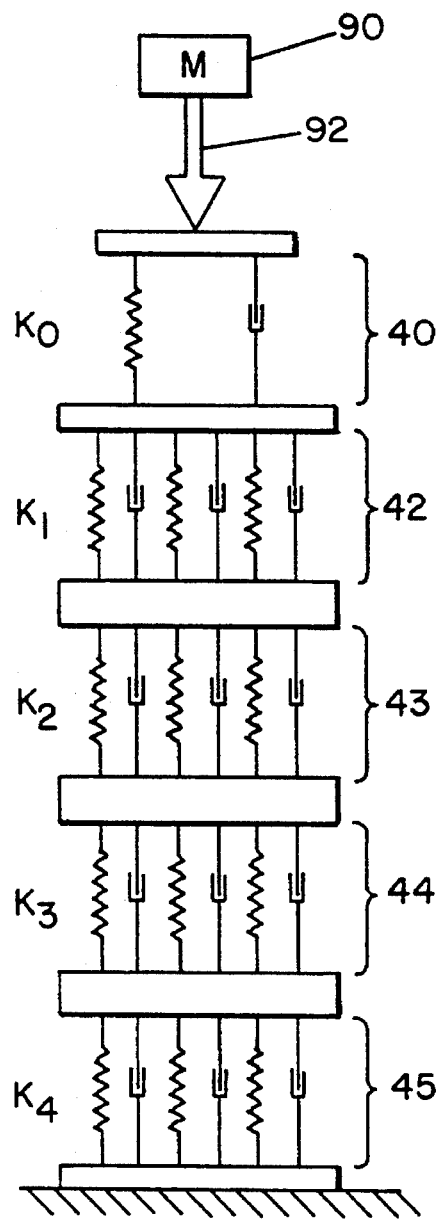
FIG. 6 is a schematic diagram of an energy absorption apparatus in accordance with the present invention.

Referring now to FIG. 6, wherein a schematic representation of energy absorption assembly 16 illustrates a motor vehicle 90 applying a force, represented by arrow 92, to the batterboard 40, which is represented by a spring rate and damping constant $K_0$. Stages 42–45 are represented by variable spring rate and damping constants $K_1$, $K_2$, $K_3$, and $K_4$. Constants $K_1$–$K_4$ are illustrated as being variable, because the spring rate of each spring in scissors assemblies 52 change as they are wound due to the collapse of the assemblies. It is to be noted that other springs may also be utilized in place of the variable springs illustrated herein.

Figure 7:
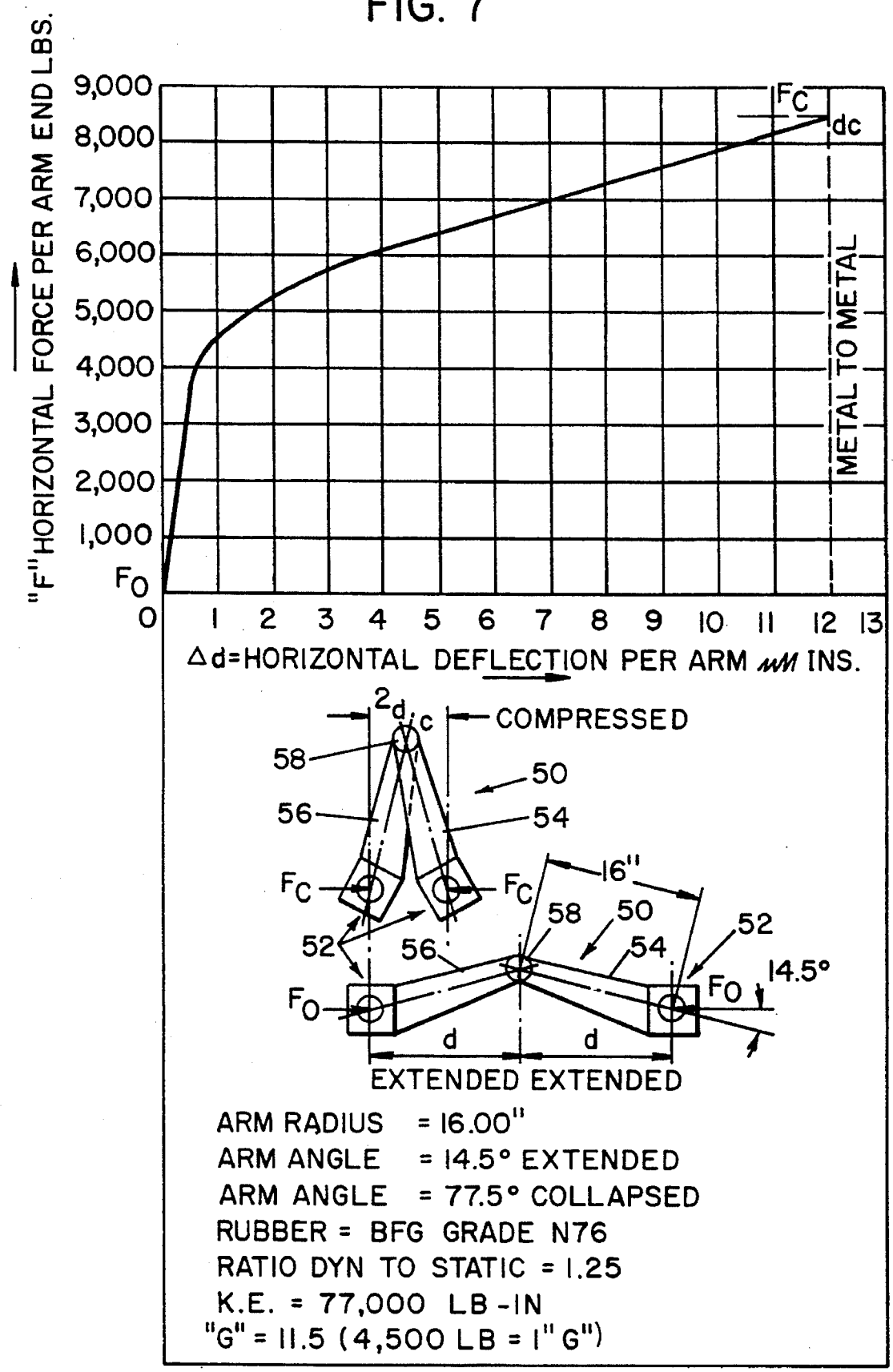
FIG. 7 is a graph showing the relationship of load to deflection of a typical elastomeric torsion spring scissors assembly in accordance with the present invention.

Referring now to FIG. 7, wherein a spring force versus travel distance curve graphically represents the energy absorption characteristics of a typical scissors assembly 50 of the present invention. The area under the curve illustrated in FIG. 5 represents the total energy absorbed by each scissors assembly 50. It can be seen that load resistance rapidly increases for small deflections, and makes a smooth transition to a nearly constant rate as the deflection increases.

Figure 8:
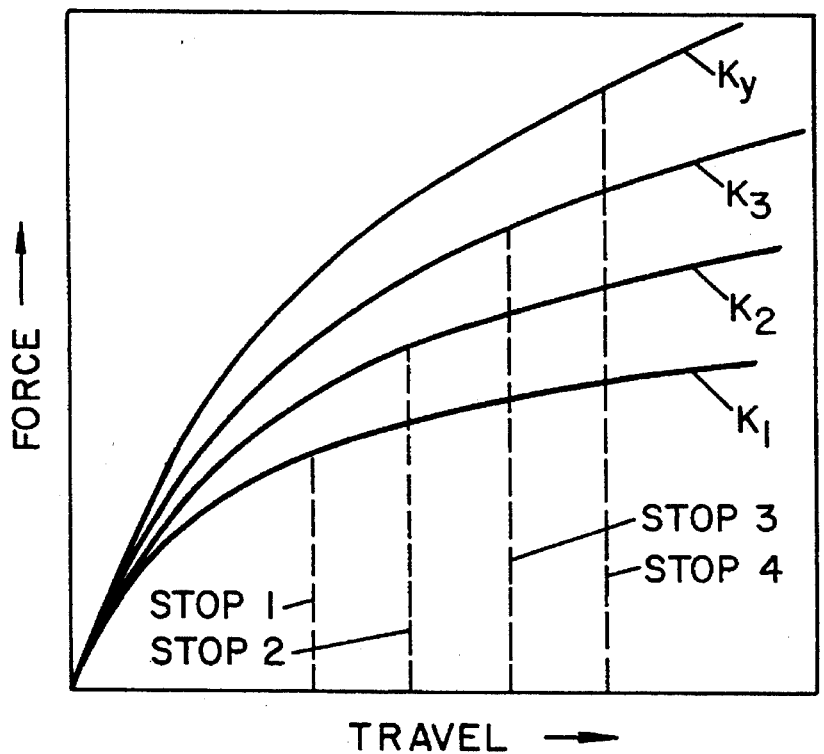
FIG. 8 is a graph showing the relationship of the load verses deflection of the different stages of an energy absorption apparatus in accordance with the present invention.

Referring now to FIG. 8, wherein a typical spring force versus travel distance for each of the stages is illustrated. Four stop points are illustrated, representing travel points where each stage is totally collapsed, thereby no longer providing any spring resistance to further movement.

Figure 9:
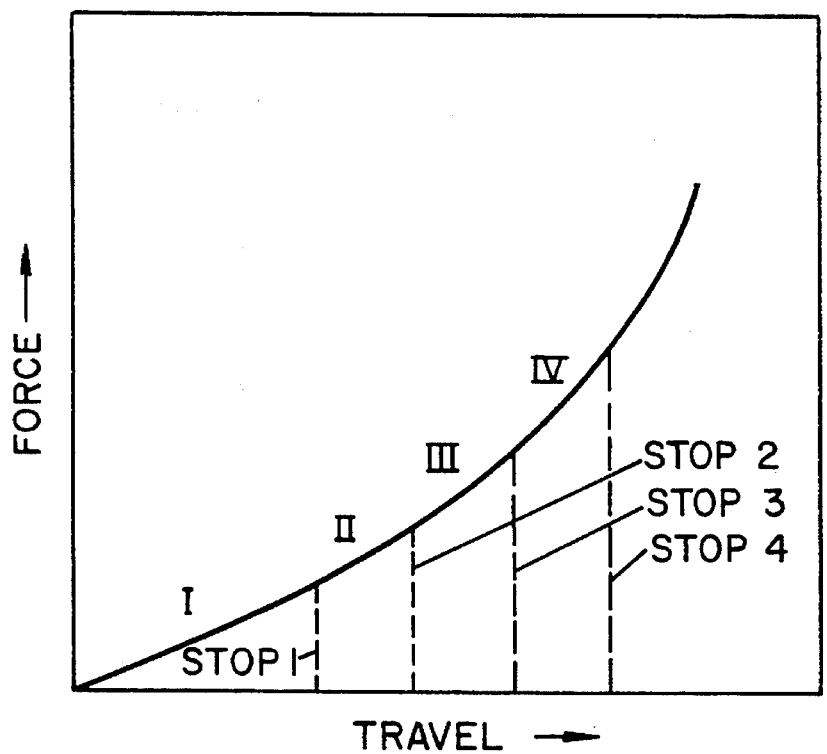
FIG. 9 is a graph showing the relationship of load verses deflection for an energy absorption apparatus in accordance with the present invention.

Referring now to FIG. 9, the spring force versus travel distance of energy absorption assembly 16 is graphically illustrated. It can be seen that the force constant increases rapidly with travel distance, thereby going from a low force at small travel distances to much larger forces as the motor vehicle gets closer to I beams 28.

Figure 10:
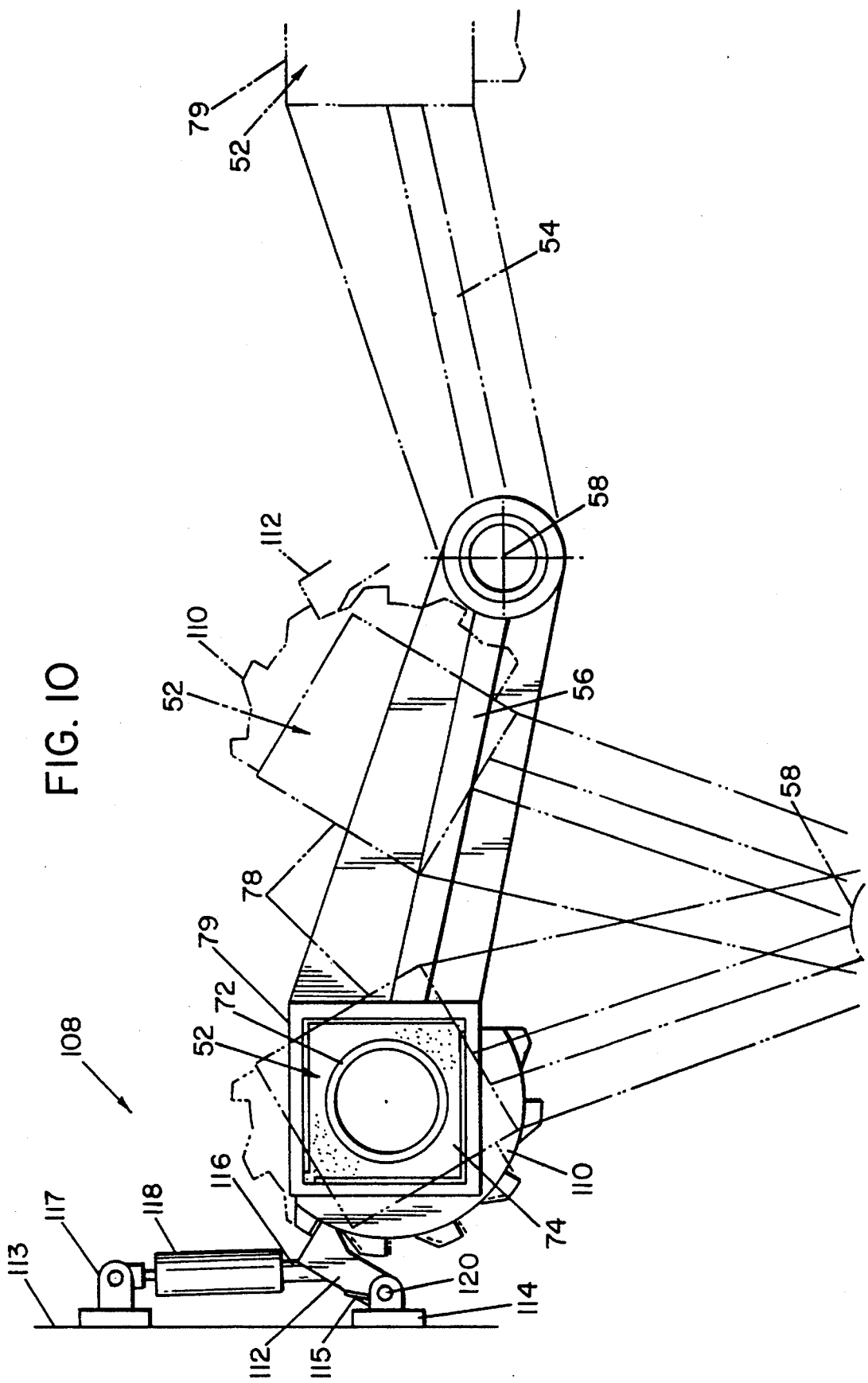
FIG. 10 is a side view, partly broken away, of a rebound control device for an energy absorption apparatus in accordance with the present invention.

Referring now to FIG. 10, a rebound control device 108 for preventing the energy absorption assembly 16 from springing outward after a collision includes a lock gear 110 which is attached to the middle housing 78 of each spring 52. A ratchet pawl 112 is rotatably connected by a hinge 114 to a support brace 113 and spring loaded by a spring 115. During deployment, ratchet pawl 112 is raised upward by a lift arm 116, which is driven by a solenoid actuator 118. The other end of solenoid actuator 118 is rotatably connected by a hinge 117 to brace 113. A connecting shaft 120 connects both pawls 112 to lift arm 116. After deployment, ratchet pawl 112 is forced downward by spring 115 to engage with gear 110. Once engaged, ratchet pawl 112 allows rotation of ratchet gear 110 (and housing 78) only in the direction of impact, thus preventing recoil of energy absorption assembly 16 after impact. Of course, other rebound control devices other than that illustrated herein may be utilized.

Figure 11:
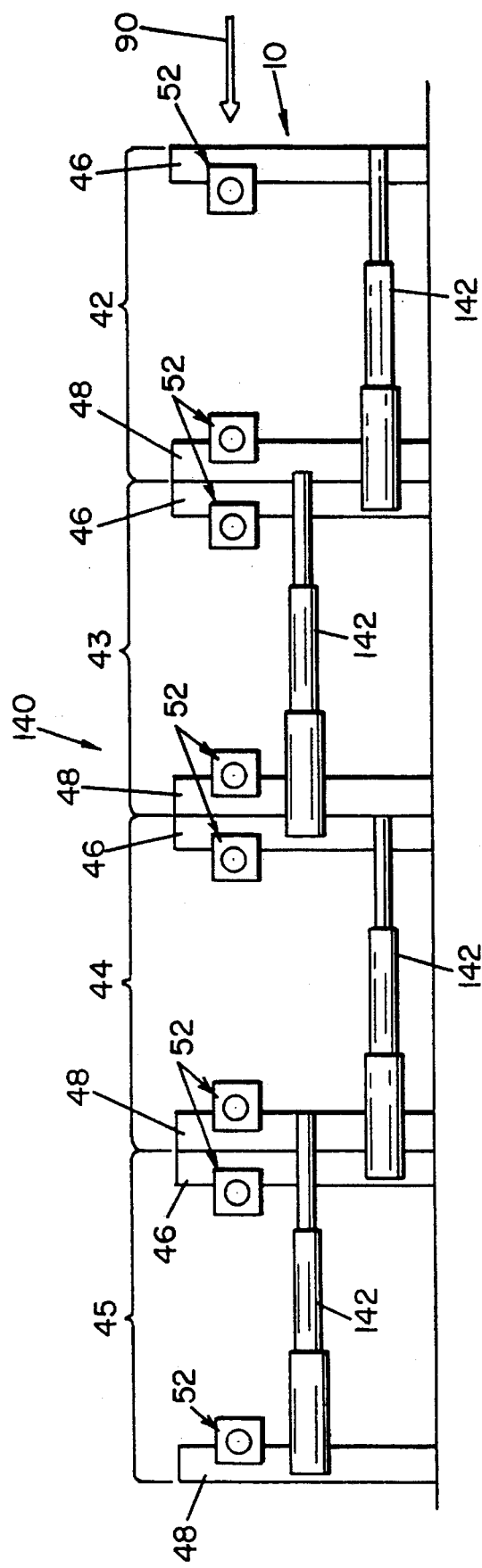
FIG. 11 is a schematic diagram of a deployment/retraction device in a deployed state for an energy absorption apparatus in accordance with the present invention.

Referring now to FIG. 11, energy absorption assembly 16 also has a deployment/retraction device 140, which includes a plurality of hydraulic cylinders 142, each of which are connected between stages 42–45. Hydraulic cylinders 142 perform two functions. First, they pull batterboard 40 toward I beams 28 to collapse assembly 16 at the appropriate time during deployment and in preparation of storage. Second, they push batterboard 40 away from I beams 28 to ensure full horizontal deployment of assembly 16 at the appropriate time of the deployment phase.

Figure 12:
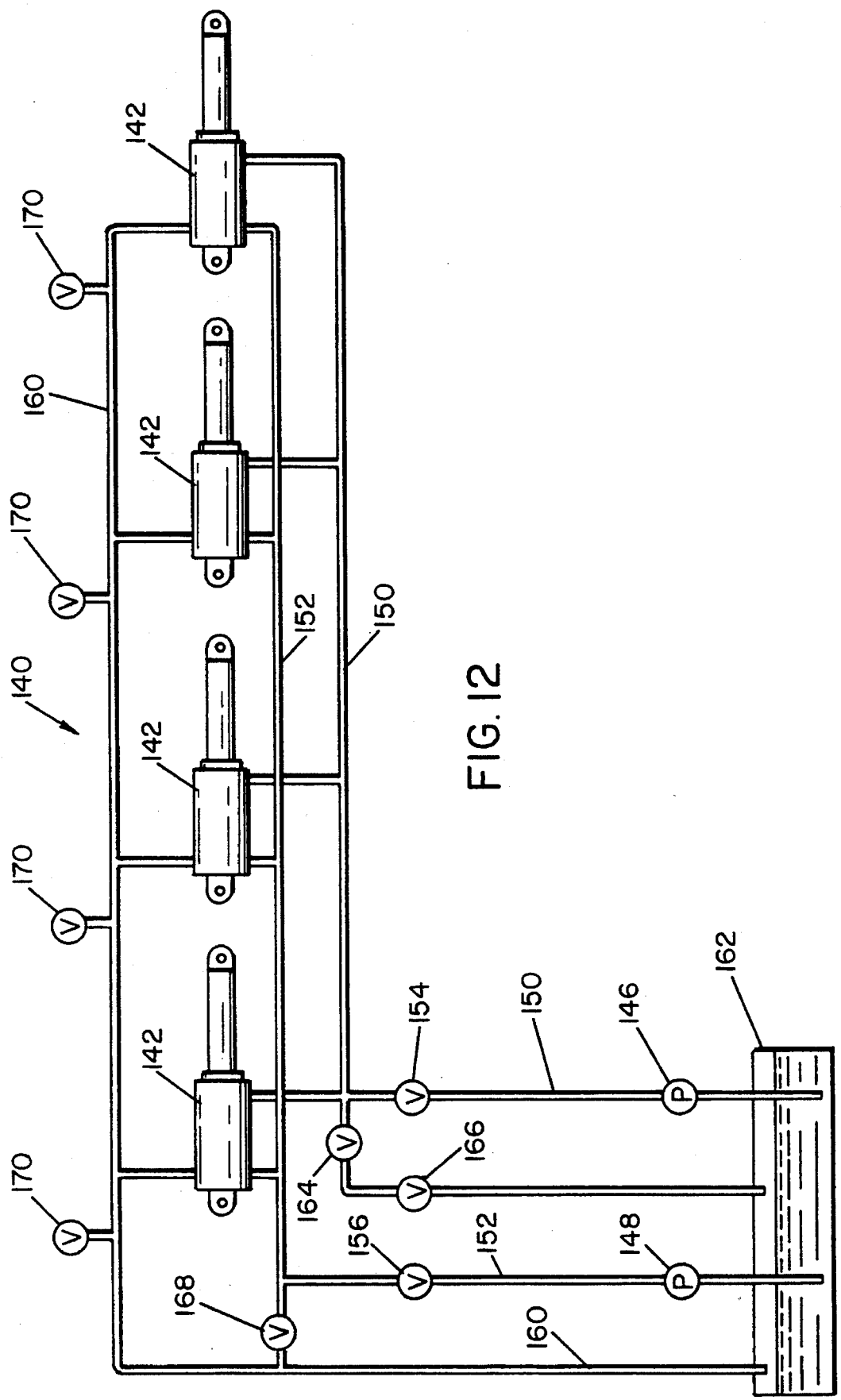
FIG. 12 is a schematic diagram of a deployment/retraction device for an energy absorption apparatus in accordance with the present invention.

Referring now to FIG. 12, deployment/retraction device 140 includes a plurality of hydraulic cylinders 142, which are provided hydraulic fluid from a pair of hydraulic pumps 146, 148. Pump 146 provides high volume, high pressure fluid through a line 150 for retraction of energy absorption assembly 16, while pump 148 provides high volume, low pressure fluid through a line 152 for deployment of energy absorption assembly 16. A solenoid actuated valve 154 turns the fluid on and off through line 150 and a solenoid actuated valve 156 turns the fluid on and off through line 152. Fluid is returned through a line 160 to a fluid sump 162. A solenoid actuated valve 164 vents line 150 through a flow control valve 166 to sump 162. A solenoid actuated valve 168 vents line 152 to sump 162. A plurality of in line relief valves 170 relieve excessive pressure buildup between hydraulic cylinders 142.

Figure 13A:
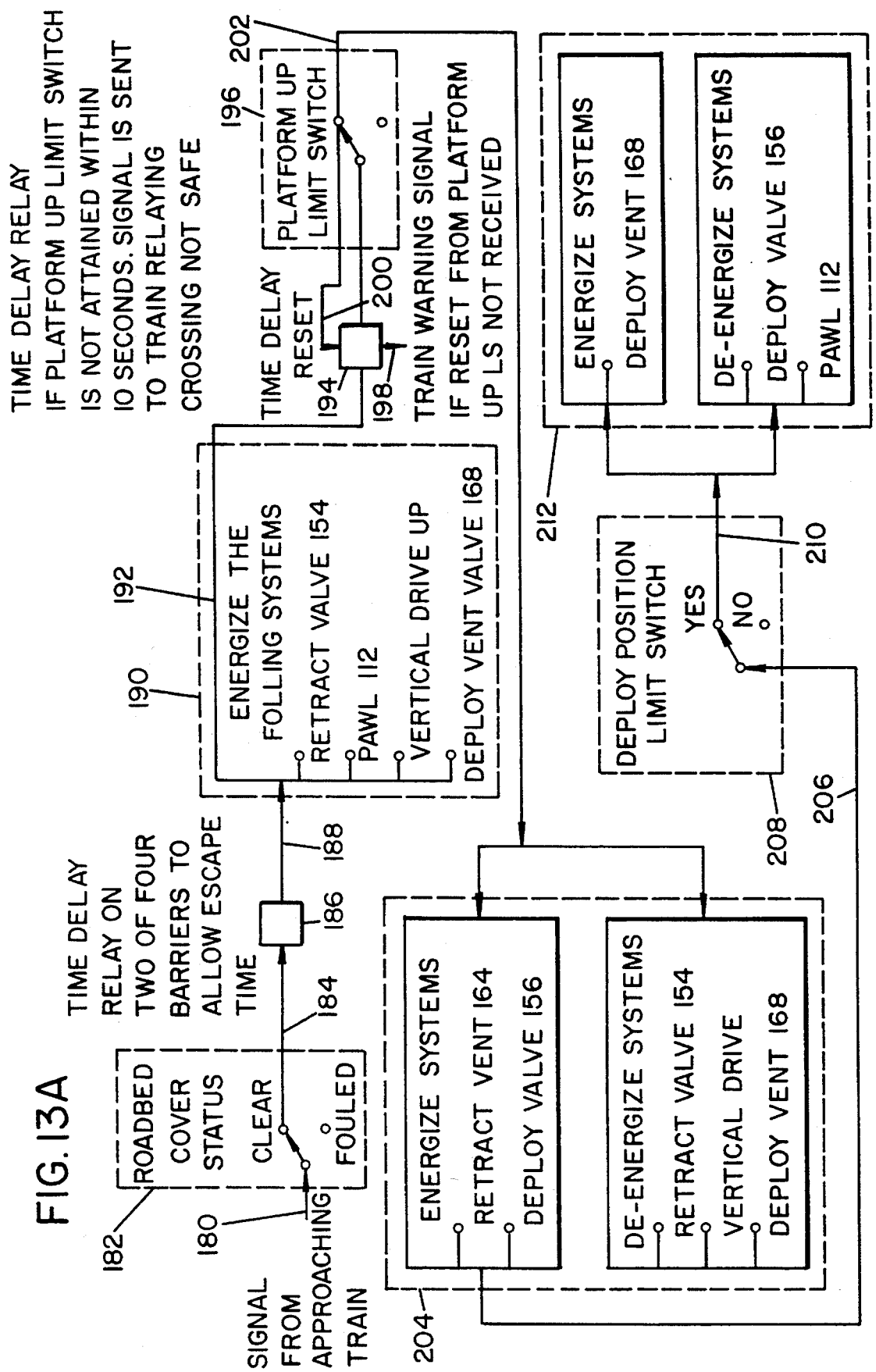
FIG. 13a is a logic flow diagram for deployment operation of a deployment/retraction device for an energy absorption apparatus in accordance with the present invention.

Referring now to FIG. 13a, deployment operation of barrier 10 is as follows. A train approach signal is provided on a line 180 to a road bed cover status check switch 182. If the cover is clear, a clear signal is provided on a line 184 to a time delay 186, which provides a delayed clear signal on a line 188 to a controller 190 which energizes retract valve 154, ratchet pawl solenoid 118, vertical drive motor 20, and deploy vent valve 168 to thereby retract cylinders 142, disengage pawl 112, and drive assembly 16 upward. The status of controller 190 is provided on a line 192 to a delay circuit 194, which queries the status of a platform up limit switch 196. If the platform is not up, a train warning signal is provided on a line 198. If the platform is up, a reset signal is provided on a line 200 to circuit 194 and a platform up signal is provided on a line 202 to a controller 204 which then energizes retract vent valve 164 and deploy valve 156 and de-energizes retract valve 154, drive motor 20, and deploy vent valve 168 to thereby extend cylinders 142. The status of controller 204 is provided on a line 206 to a deploy limit switch 208. If deploy limit switch 208 is set, a fully deployed signal is provided on a line 210 to a controller 212 which energizes deploy vent valve 168 and de-energizes deploy valve 156 and ratchet pawl solenoid 118 to thereby stop further extension of cylinders 142 and engage pawl 112. Energy absorption assembly 16 is now fully deployed.

Figure 13B:
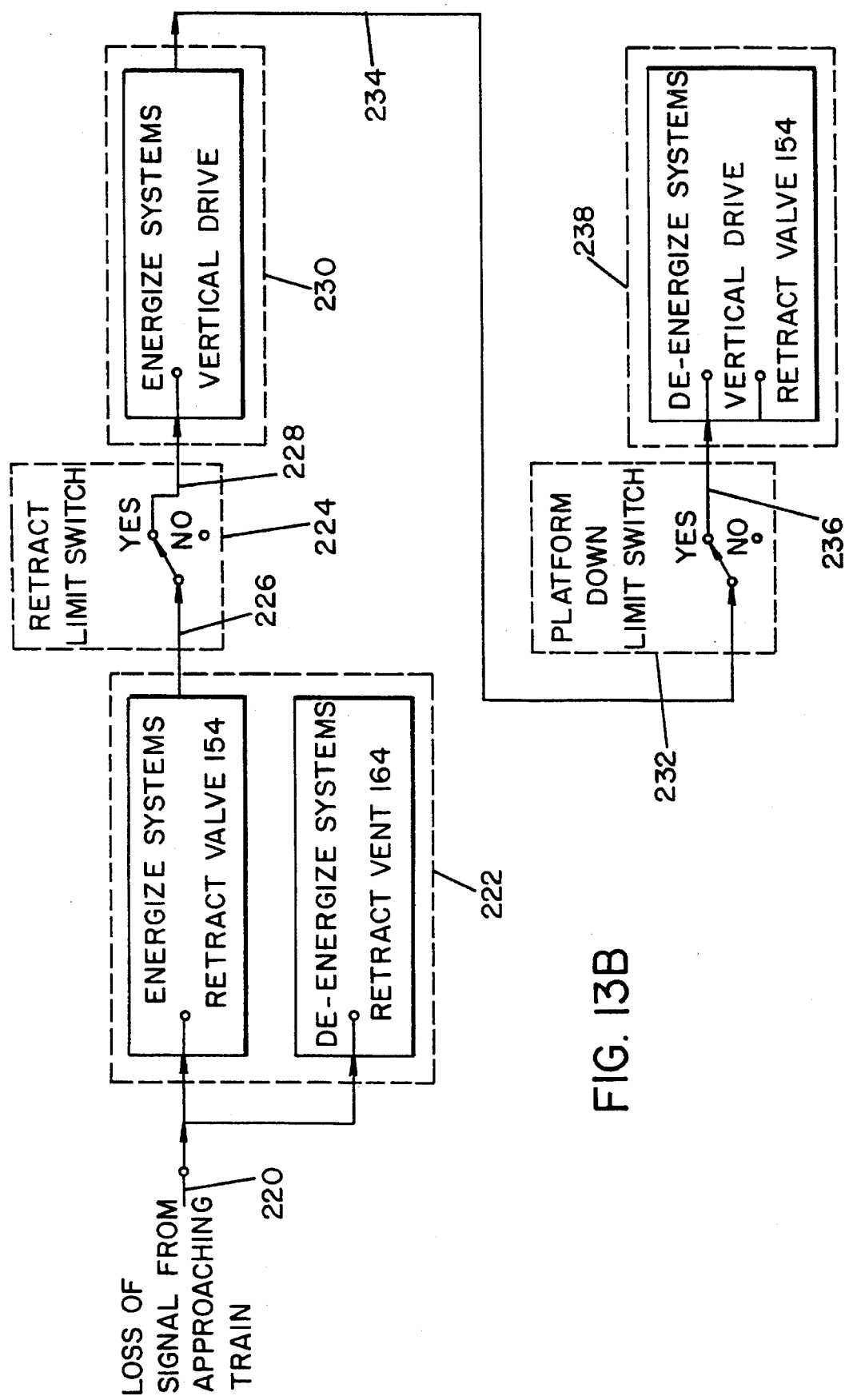
FIG. 13b is a logic flow diagram for retraction operation of a deployment/retraction device for an energy absorption apparatus in accordance with the present invention.

Referring now to FIG. 13b, retraction operation of barrier 10 is as follows. A train departure signal is provided on a line 220 to a controller 222 which energizes retract valve 154 and de-energizes retract vent valve 164 and queries a retract limit switch 224 on a line 226. If switch 224 is activated, a fully retracted signal is provided on a line 228 to a controller 230 which thereby energizes vertical drive motor 20 to move assembly 16 downward. A platform down limit switch 232 is queried on a line 234. If switch 232 is activated, a platform down signal is provided on a line 236 to a controller 238 which de-energizes drive motor 20 and retract valve 154. The barrier is now in the fully retracted position and stowed. It is to be noted that controllers 190, 204, 212, 222, 230 and 238 may be combined into a single unit.

Although the invention has been shown and described with exemplary embodiments thereof, it should be understood by those skilled in the art that the foregoing and various other changes, omissions and additions may be made therein and thereto without departing from the spirit and scope of the invention.

We claim:
1. An apparatus for decelerating a moving vehicle comprising:
   energy absorption means for absorbing kinetic energy of the moving vehicle, said energy absorption means comprising a collapsible assembly which is collapsed for storage in said vault means and is expanded upon deployment and having at least one elastomeric torsion spring for energy absorption;
   vault means for receiving said energy absorption means when it is not being used; and, deployment means for deploying said energy absorption means in the path of the vehicle.

2. An apparatus for decelerating a moving vehicle in accordance with claim 1, wherein said energy absorption means is comprised of a plurality of pairs of elastomeric torsion springs, each of said elastomeric torsion springs in said plurality of pairs being pivotally connected in a scissors arrangement.

3. An apparatus for decelerating a moving vehicle in accordance with claim 2, wherein each one of said plurality of pairs of elastomeric torsion springs are comprised of a series torsion spring arrangement.

4. An apparatus for decelerating a moving vehicle in accordance with claim 3, wherein said scissor means are arranged in a series of stages and the spring rates of said scissors means in each stage increase in the direction the vehicle is moving.

5. An apparatus for decelerating a moving vehicle in accordance with claim 4, wherein the spring rates of said scissors means in each stage increase in the direction the vehicle is moving.

6. An apparatus for decelerating a moving vehicle in accordance with claim 3, wherein the spring rates of said scissors means vary.

7. An apparatus for decelerating a moving vehicle in accordance with claim 3, wherein said elastomeric members are generally square shaped in cross section.

8. An apparatus for decelerating a moving vehicle in accordance with claim 2, wherein the spring rates of said pairs of elastomeric torsion springs vary.

9. An apparatus for decelerating a moving vehicle in accordance with claim 2, wherein said pairs of elastomeric torsion springs are arranged in a series of stages.

10. An apparatus for decelerating a moving vehicle in accordance with claim 9, wherein the spring rates of said pairs of elastomeric torsion springs in each stage increase in the direction the vehicle is moving.

11. An apparatus for decelerating a moving vehicle in accordance with claim 1, wherein said energy absorption means is comprised of a plurality of elastomeric torsion springs having differing spring rates.

12. An apparatus for decelerating a moving vehicle in accordance with claim 11, wherein said elastomeric torsion springs are arranged in a series of stages.

13. An apparatus for decelerating a moving vehicle in accordance with claim 12, wherein said spring rates of said springs in each stage increase in the direction the vehicle is moving.

14. An apparatus for decelerating a moving vehicle in accordance with claim 11, wherein said spring rates increase in the direction the vehicle is moving.

15. An apparatus for decelerating a moving vehicle in accordance with claim 1, wherein said energy absorption means is comprised of at least one pair of elastomeric torsion springs pivotally connected in a scissors arrangement.

16. An apparatus for decelerating a moving vehicle in accordance with claim 15, wherein each one of said at least one pair of elastomeric torsion springs are comprised of a series torsion spring arrangement.

17. An apparatus for decelerating a moving vehicle in accordance with claim 16, wherein said elastomeric members are generally square shaped in cross section.

18. An apparatus for decelerating a moving vehicle in accordance with claim 1, wherein said energy absorption means is comprised of at least one scissors means, each one of said at least one scissors means being comprised of:

first shaft means;

first elastomeric member having a first inner surface attached to said first shaft means and a first outer surface attached to a first support means;

second elastomeric member having a second inner surface attached to said first shaft means and a second outer surface attached to a first arm extending away from said second elastomeric member;

second shaft means;

third elastomeric member having a third inner surface attached to said second shaft means and a third outer surface attached to a second support means;

fourth elastomeric member having a fourth inner surface attached to said second shaft means and a fourth outer surface attached to a second arm extending away from said fourth elastomeric member; and, pivot means for pivotally connecting the distal ends of said first and second arms.

19. An apparatus for decelerating a moving vehicle in accordance with claim 18, wherein said elastomeric members are generally square shaped in cross section.

20. An apparatus for decelerating a moving vehicle in accordance with claim 1, wherein said energy absorption means is comprised of a plurality of scissors means, each one of said plurality of scissors means being comprised of:

first shaft means;

first elastomeric member having a first inner surface attached to said first shaft means and a first outer surface attached to a first support means;

second elastomeric member having a second inner surface attached to said first shaft means and a second outer surface attached to a first arm extending away from said second elastomeric member;

second shaft means;

third elastomeric member having a third inner surface attached to said second shaft means and a third outer surface attached to a second support means;

fourth elastomeric member having a fourth inner surface attached to said second shaft means and a fourth outer surface attached to a second arm extending away from said fourth elastomeric member; and, pivot means for pivotally connecting the distal ends of said first and second arms.

21. An apparatus for decelerating a moving vehicle in accordance with claim 20, wherein the spring rates of said scissors means vary.

22. An apparatus for decelerating a moving vehicle in accordance with claim 20, wherein said scissor means are arranged in a series of stages and the spring rates of said scissors means in each stage increase in the direction the vehicle is moving.

23. An apparatus for decelerating a moving vehicle in accordance with claim 20, wherein the spring rates of said scissors means in each stage increase in the direction the vehicle is moving.

24. An apparatus for decelerating a moving vehicle in accordance with claim 20, wherein said elastomeric members are generally square shaped in cross section.

25. An apparatus for decelerating a moving vehicle in accordance with claim 1, wherein said energy absorption means is comprised of a plurality of stages with differing spring rates.

26. An apparatus for decelerating a moving vehicle in accordance with claim 25, wherein said spring rates increase in the direction the vehicle is moving.

27. An apparatus for decelerating a moving vehicle in accordance with claim 1, further comprising backing means for rigidly supporting said energy absorption means.

28. An apparatus for decelerating a moving vehicle in accordance with claim 27, wherein said backing means is comprised of at least one I beam.

29. An apparatus for decelerating a moving vehicle in accordance with claim 1, further comprising controller means for controlling said deployment means to deploy said energy absorption means upon the occurrence of a predetermined event.

30. An apparatus for decelerating a moving vehicle in accordance with claim 1, wherein said deployment means deploys said energy absorption means substantially vertically before said energy absorption means is expanded.

31. An apparatus for decelerating a moving vehicle in accordance with claim 1, wherein said deployment means is comprised of drive screws for driving said energy absorption means out said vault and drive motor means for turning said drive screws.

32. An apparatus for decelerating a moving vehicle in accordance with claim 1, wherein said vault means is disposed in the ground.

33. An apparatus for decelerating a moving vehicle in accordance with claim 1, further comprising batterboard means for contacting the vehicle, said batterboard means being comprised of a plastic and elastomer composite.

34. An apparatus for decelerating a moving vehicle in accordance with claim 1, further comprising ratchet means for holding said energy absorption means in the collapsed state before deployment and after partial collapsing due to vehicle contact.

35. An apparatus for decelerating a moving vehicle comprising:

energy absorption means for absorbing kinetic energy of the moving vehicle upon collision of the vehicle with said energy absorption means, said energy absorption means being comprised of a plurality of stages, each one of said plurality of stages having at least one pair of elastomeric torsion springs, each one of said elastomeric torsion springs in said at least one pair being pivotally connected in a scissors arrangement;

deployment means for deploying said energy absorption means in the path of the vehicle;

controller means for controlling said deployment means to deploy said energy absorption means upon the occurrence of a predetermined event;

backing means for rigidly supporting said energy absorption means;

batterboard means for contacting the vehicle, said batterboard means being comprised of a plastic and elastomer composite; and, vault means for receiving said energy absorption, backing and batterboard means when it is not being used;

wherein said energy absorption means is collapsed for storage in said vault means and is expanded upon deployment by said deployment means.

36. A method of decelerating a moving vehicle comprising the steps of:

providing a collapsible energy absorption means comprising at least one elastomeric torsion spring;

collapsing and storing said energy absorption means in a vault; and deploying and expanding said energy absorption means in the path of the vehicle in response to a predetermined event.

37. A method of decelerating a moving vehicle in accordance with claim 36, wherein said energy absorption means is comprised of at least one pair of elastomeric torsion springs pivotally connected in a scissors arrangement.

38. A method of decelerating a moving vehicle in accordance with claim 36, wherein said energy absorption means is comprised of a multiplicity of pairs of elastomeric torsion springs pivotally connected in a scissors arrangement.

39. A method of decelerating a moving vehicle in accordance with claim 38, wherein each one of said multiplicity of pairs of elastomeric torsion springs have differing spring rates.

* * * * *